United States Patent [19]
Gaudet

[11] Patent Number: 6,088,415
[45] Date of Patent: Jul. 11, 2000

[54] APPARATUS AND METHOD TO ADAPTIVELY EQUALIZE DUTY CYCLE DISTORTION

[75] Inventor: Brian Gaudet, San Jose, Calif.

[73] Assignee: National Semiconductor Corporation, Santa Clara, Calif.

[21] Appl. No.: 09/028,144

[22] Filed: Feb. 23, 1998

[51] Int. Cl.[7] .................................................. H03D 3/24
[52] U.S. Cl. ........................... 375/376; 327/170; 327/34; 713/503
[58] Field of Search ..................... 375/376, 371, 375/229; 713/503; 327/172, 170, 34, 158, 175

[56] References Cited

U.S. PATENT DOCUMENTS

| | | | |
|---|---|---|---|
| 4,831,637 | 5/1989 | Lawrence et al. | 375/118 |
| 4,847,875 | 7/1989 | Choi | 375/112 |
| 5,311,084 | 5/1994 | Gabara | 307/491 |
| 5,329,559 | 7/1994 | Wong et al. | 375/119 |
| 5,349,612 | 9/1994 | Guo et al. | 375/118 |
| 5,402,443 | 3/1995 | Wong | 375/10 |
| 5,452,333 | 9/1995 | Guo et al. | 375/371 |
| 5,740,210 | 4/1998 | Rokugawa | 375/362 |
| 5,761,241 | 6/1998 | Martin | 375/226 |
| 5,786,718 | 7/1998 | Ruuskanen | 327/166 |

*Primary Examiner*—Stephen Chin
*Assistant Examiner*—Mohammad Ghayour
*Attorney, Agent, or Firm*—Limbach & Limbach, LLP

[57] ABSTRACT

An apparatus for and method of removing duty cycle distortion jitter from data by adaptive equalization are disclosed. The apparatus includes an equalization circuit which equalizes input data based on an equalization control signal, a signal analysis circuit, and a control circuit which generates the equalization control signal. A multiport apparatus includes a plurality of equalization circuits, a multiplexor, a signal analysis circuit, and a control circuit. A method includes the steps of receiving an equalization control signal and the input data signal, equalizing the input data signal based on the equalization control signal, analyzing the equalized data signal and generating an analysis result signal, and generating the equalization control signal based on the analysis result signal.

26 Claims, 7 Drawing Sheets

APPARATUS AND METHOD TO ADAPTIVELY EQUALIZE DUTY CYCLE DISTORTION

BACKGROUND OF THE INVENTION

1. Field of the Invention

The present invention relates to circuits for removing duty cycle distortion jitter from a signal. In particular, the invention relates to the use of phase-lock loops and recovered clock signals to provide feedback control of the jitter.

2. Description of the Related Art

Transmitters in a communication system are not ideal. One of the nonidealities is rise/fall mismatch, which generates duty cycle distortion ("DCD") jitter.

FIG. 1a illustrates a case with no DCD, that is, rise time $t_r$ is equal to fall time $t_f$. The signal $RX_{data}$ shows the possible transitions of the data signal. The signal $RXC_r$ shows a recovered clock generated from a phase-lock loop ("PLL") locked to rising edge transitions of $RX_{data}$. The signal $RXC_f$ shows a recovered clock generated from a PLL locked to falling edge transitions of $RX_{data}$. Note that $RXC_r$ and $RXC_f$ are exactly in phase.

FIG. 1b illustrates a case where $t_r$ is less than $t_f$. This causes $RXC_r$ to lead $RXC_f$ by a phase differential.

FIG. 1c illustrates that when $t_r$ is greater than $t_f$, $RXC_r$ follows $RXC_f$ by a phase differential.

Rise/fall mismatch eats into the jitter budget for the system. For example, with a typical 100Base-T ethernet, fixed jitter caused by rise/fall mismatch can account for 22% of a zero to peak jitter budget of 3 ns. As embedded clock frequencies continue to increase, rise/fall mismatch becomes an even larger portion of the jitter budget.

This problem is not limited to the receiver. It is difficult to design a transmitter that can meet the strict rise/fall mismatch specifications of 100Base-T and 1000FX/CX ethernet. If a method for removing this duty cycle distortion ("DCD") prior to clock recovery could be developed, the clock recovery system would have an easier task because it would be dealing with reduced jitter on the input signal.

For example, in 100Base-T ethernet, a signal with 0.67 ns DCD, 1 ns data-dependent jitter ("DDJ"), and 1.3 ns Gaussian jitter ("RJ") has an eye of only 1 ns zero to peak. If the DCD could be eliminated, the eye increases to 1.67 ns zero to peak, a 67% increase. This improvement could be used to design a cheaper clock recovery module. It could also be used to design a cheaper DDJ equalizer, which removes most of the DDJ and consumes most of the power and chip area in a 100Base-T physical layer.

A PLL phase detector can be made more robust to DCD by looking at both edges of data. This will allow the PLL to lock to the midpoint of both means in a bimodal jitter distribution. Because the PLL gives equal weight to rising and falling edge phase errors, the PLL locks to halfway between where a PLL looking at only rising edges and a PLL looking at only falling edges would lock to. This means that the eye is reduced by an amount equal to half the DCD. This is the best a clock recovery PLL can do without DCD equalization.

In addition, some present methods of DCD equalization sample the rise and fall times and then compute an adjustment after a defined number of samples have been collected. There is a need for adjustment computed in a more stable manner.

Furthermore, some present methods only look at phase errors when the NRZ bit sequence is '0101' or '1010', that is, they require two transitions separated by one bit. This wastes some of the phase information. There is a need to examine all transitions to take advantage of more phase information.

Finally, some present methods correct DCD where the adjust resolution is a buffer delay. There is a need for decreasing this adjust resolution.

SUMMARY OF THE INVENTION

The present invention addresses these and other problems in the prior art by providing two phase-lock loop circuits for adaptively equalizing DCD jitter. This allows a more continuous adjustment of the clock signals than adjusting after a defined number of samples. It also can look at all signal transitions and adjust based on more phase information.

According to one embodiment, an apparatus according to the present invention adaptively equalizes an input data signal by removing duty cycle distortion jitter, and includes an equalization circuit, a signal analysis circuit, and a control circuit. The equalization circuit is configured to receive an equalization control signal and receive and equalize an input data signal, and to provide an equalized data signal. The equalized data signal includes pluralities of rising and falling edges with associated rise and fall times, wherein the rise and fall times are substantially equal. The signal analysis circuit is coupled to the equalization circuit and is configured to receive and analyze the equalized data signal, and to provide a plurality of analysis result signals. Each one of the analysis result signals represents one of a plurality of characteristics of the equalized data signal. The control circuit is coupled to the signal analysis circuit and the equalization circuit and is configured to receive and process the plurality of analysis result signals, and to provide the equalization control signal.

According to another embodiment, a multiport apparatus adaptively equalizes an input data signal by removing duty cycle distortion jitter and includes a plurality of equalization circuits, a multiplexor circuit, a signal analysis circuit, and a control circuit. Each one of the plurality of control circuits is configured to receive a select signal and an equalization control signal and receive and equalize an input data signal and provide an equalized data signal. The equalized data signal includes pluralities of rising an falling edges with associated rise and fall times, respectively, wherein the rise and fall times are substantially equal. The multiplexor circuit is configured to receive a plurality of equalized data signals and output one of the plurality of equalized data signals based on the select signal. The signal analysis circuit is coupled to the multiplexor circuit, and is configured to receive and analyze the one equalized data signal and provide a plurality of analysis result signals. Each one of the analysis result signals represents one of a plurality of characteristics of the equalized data signal. The control circuit is coupled to the signal analysis circuit, the multiplexor circuit, and the plurality of equalization circuits, and is configured to receive and process the plurality of analysis result signals and provide the equalization control signal, and configured to output the select signal.

According to still another embodiment, a method according to the present invention adaptively equalizes an input data signal by removing duty cycle distortion jitter, and includes the steps of receiving an equalization control signal and the input data signal, equalizing the input data signal based on the equalization control signal, analyzing the equalized data signal and generating an analysis result signal, and generating the equalization control signal based on the analysis result signal.

A better understanding of the features and advantages of the present invention will be obtained by reference to the following detailed description and accompanying drawings which set forth illustrative embodiments in which the principles of the invention are utilized.

DETAILED DESCRIPTION OF THE PREFERRED EMBODIMENTS

As detailed above, the present invention solves the problems of the prior art with a duty cycle distortion ("DCD") equalizer circuit. This section describes the invention in general, the DCD equalizer circuit, a receiver implementation, a transmitter implementation, a multiport receiver implementation, and a multiport transmitter implementation. At the transmitter, the present invention helps to meet the transmit jitter specification. At the receiver, the present invention allows easier clock signal recovery and DDJ equalization when the corresponding transmitter does not implement this invention.

General Embodiment of the Invention

Figure 2:
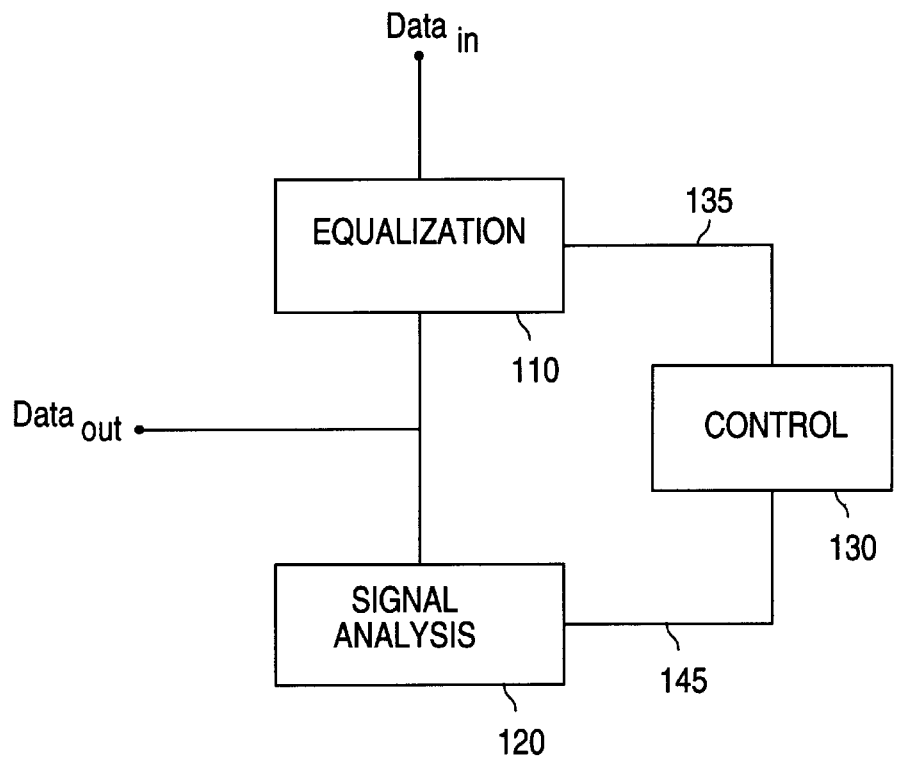
FIG. 2 is a block diagram of the invention in general.

FIG. 2 illustrates the invention in general. This figure shows an equalization circuit 110, a signal analysis circuit 120, and a control circuit 130.

Equalization circuit 110 is configured to receive an equalization control signal 135 and receive and equalize an input data signal $Data_{in}$, and to provide an equalized data signal $Data_{out}$. The equalized data signal $Data_{out}$ includes pluralities of rising and falling edges with associated rise and fall times, wherein the rise and fall times are substantially equal.

Signal analysis circuit 120 is coupled to the equalization circuit and is configured to receive and analyze equalized data signal $Data_{out}$, and to provide a plurality of analysis result signals 145. Each one of the analysis result signals represents one of a plurality of characteristics of equalized data signal $Data_{out}$.

Control circuit 130 is coupled to signal analysis circuit 120 and equalization circuit 110 and is configured to receive and process the plurality of analysis result signals 145, and to provide the equalization control signal 135.

These general components are further detailed in the following sections.

DCD Equalizer Circuit

Figure 3:
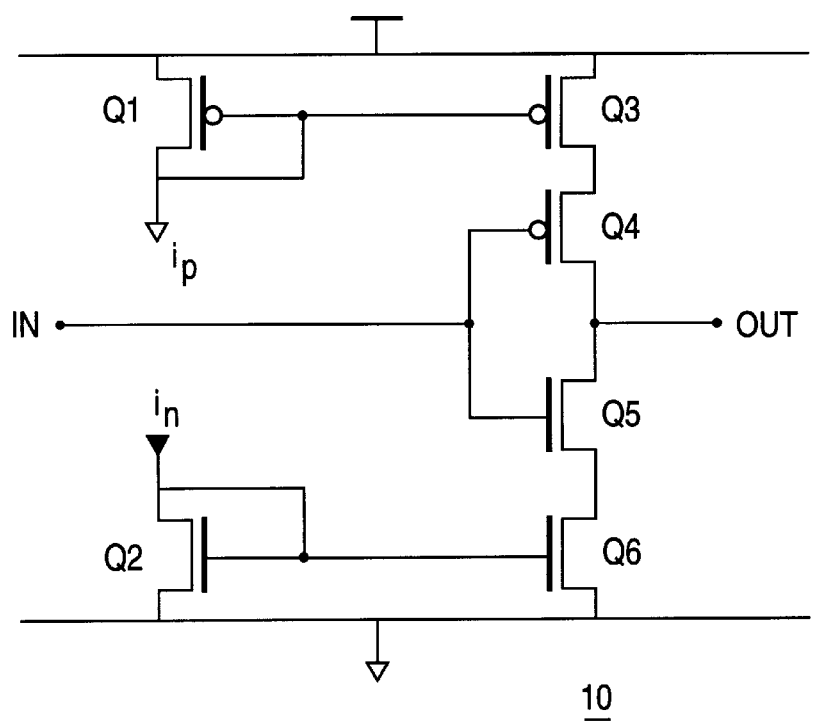
FIG. 3 is a circuit diagram of a DCD equalizer circuit.

FIG. 3 illustrates a DCD equalizer circuit 10. In a preferred embodiment, this circuit includes six transistors Q1–Q6. Transistors Q1, Q3 and Q4 are PMOS transistors, and Q2, Q5 and Q6 are NMOS transistors.

For Q1, its source is connected to the reference voltage, and its gate and drain are connected to the gate of Q3. The current conducted by Q1 is labeled $i_p$. For Q3, its source is connected to the reference voltage, and its drain is connected to the source of Q4. For Q4, its gate is connected to the DCD equalizer circuit input IN and the gate of Q5, and its drain is connected to the DCD equalizer circuit output OUT and the drain of Q5.

For Q5, its source is connected to the drain of Q6. For Q6, its gate is connected to the gate of Q2, and its source is connected to ground. For Q2, its source is connected to ground, and its drain is connected to its gate. The current conducted by Q2 is labeled $i_n$.

Transistors Q1–Q6 form a "current starved" inverter. The ratio of current $i_p$ to current in modifies, e.g., shapes, the DCD circuit input signal IN to form the output signal OUT. Current $i_n$ is established such that it satisfies two conditions. First, when current $i_p$ is at its minimum, the rise time $t_r$ is equal to the fall time $t_f$ plus the worst case rise/fall mismatch possible at the input signal. Second, when current $i_p$ is at its maximum, the fall time $t_f$ is equal to the rise time $t_r$ plus the worst case rise/fall mismatch possible at the input signal. This allows current $i_p$ to cancel the full range of rise/fall mismatch that can occur in the input signal.

Thus, if current $i_p$ is a feedback current as part of a feedback loop, current $i_p$ can adaptively equalize the DCD jitter of the input signal.

In another embodiment, current $i_p$ can be the fixed current and current in can be the variable feedback current.

In a further embodiment, both $i_p$ and $i_n$ can be varied, with $i_p$ adjusting rise time and $i_n$ adjusting fall time. This has been implemented as will be discussed in the section discussing the best mode implementation.

In yet another embodiment, DCD equalizer circuit 10 can operate on a feedback voltage instead of a feedback current.

Figure 1A:
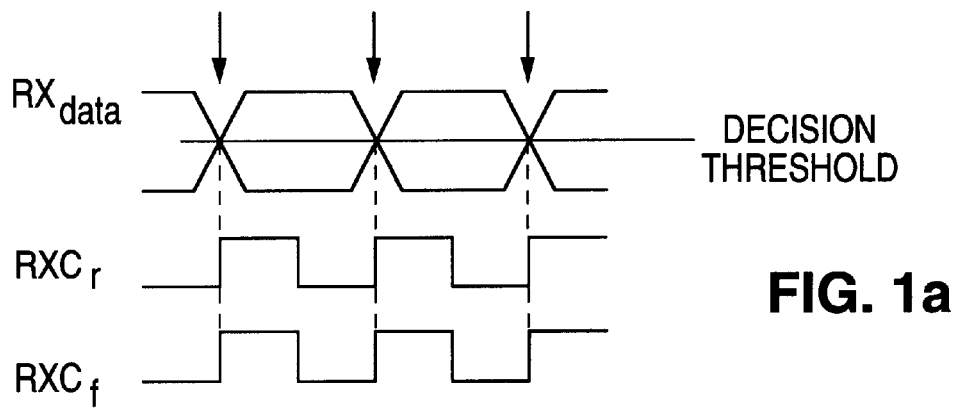
FIG. 1a is a graphical illustration of a signal with no DCD jitter and the corresponding recovered clock signals.
Figure 1B:
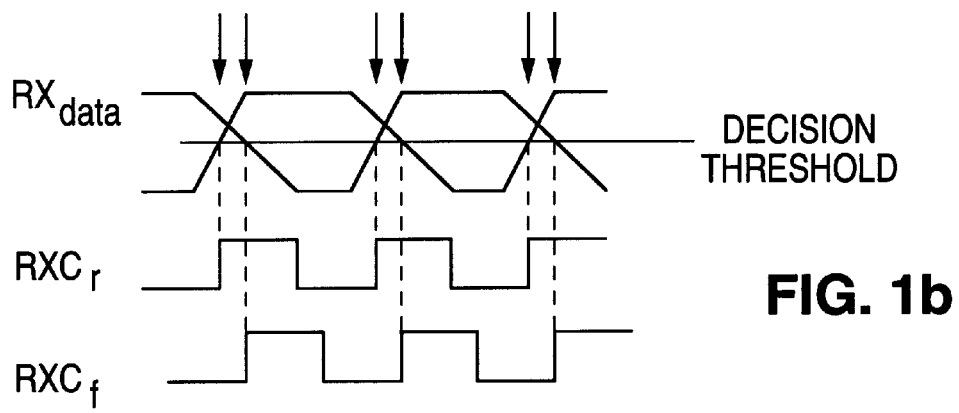
FIG. 1b is a graphical illustration of a signal with DCD jitter from a fall time greater than a rise time and the corresponding recovered clock signals.
Figure 1C:
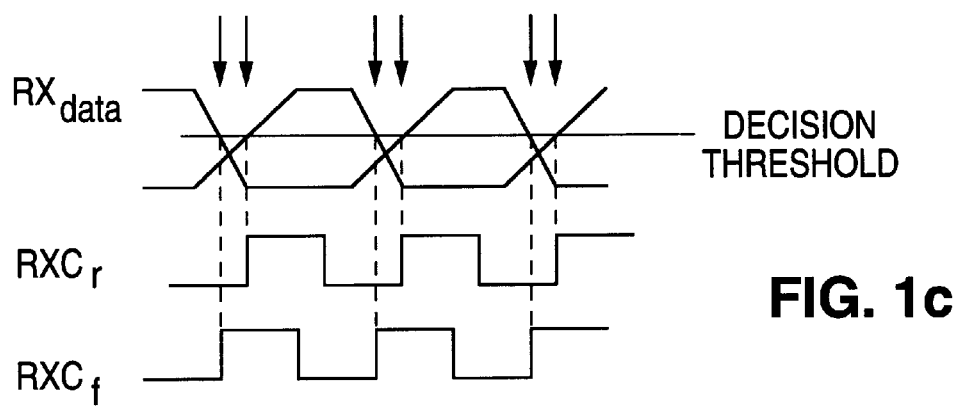
FIG. 1c is a graphical illustration of a signal with DCD jitter from a rise time greater than a fall time and the corresponding recovered clock signals.

The DCD equalizer 10 is a component of the equalization circuit 110 of FIG. 1.2. In a preferred embodiment, current $i_p$ corresponds to equalization control signal 135, IN corresponds to $Data_{in}$ and OUT corresponds to $Data_{out}$.

Receiver Implementation of DCD Equalizer Circuit

Figure 4:
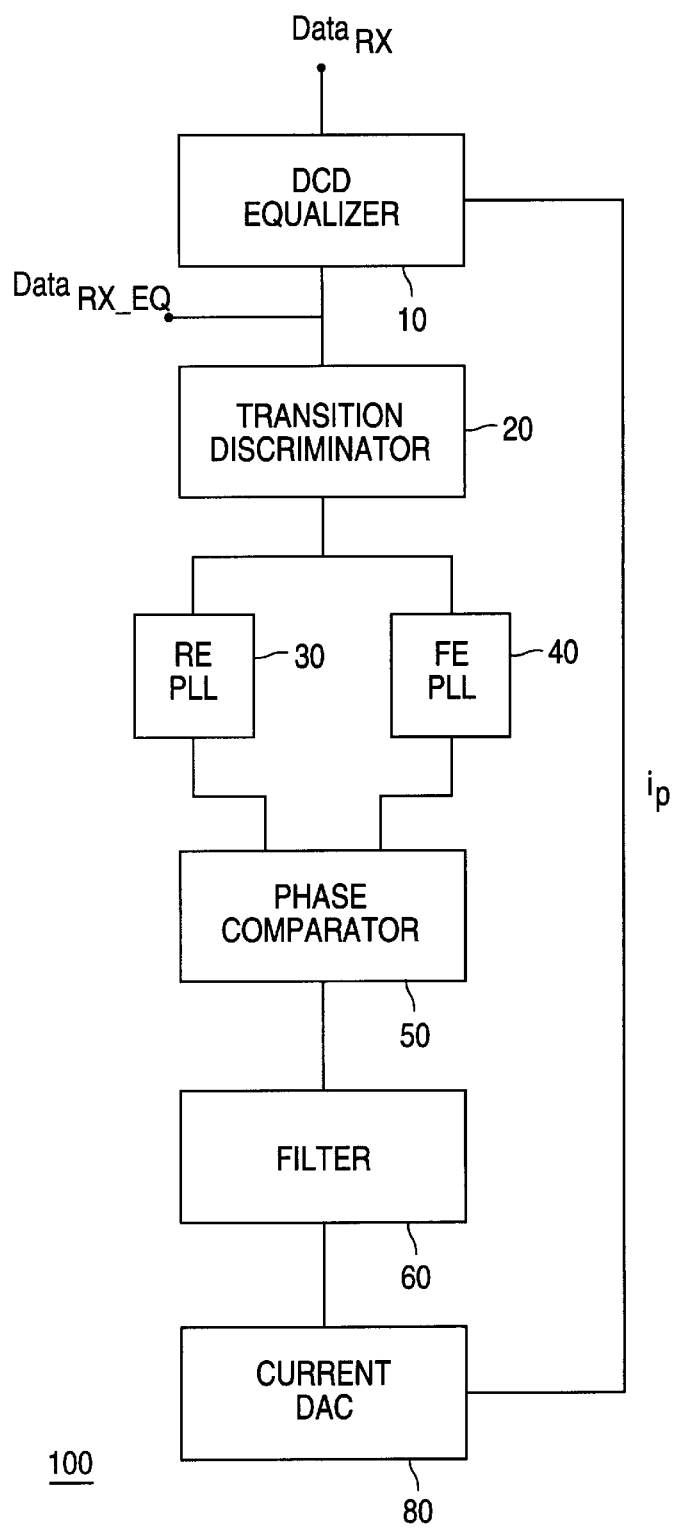
FIG. 4 is a block diagram of a receiver implementation according to one embodiment of the present invention.

FIG. 4 shows a block diagram of a preferred embodiment of a receiver implementation of the present invention, termed adaptive DCD equalization receiver 100. The DCD equalizer 10 receives the input data $Data_{RX}$ and the feedback current $i_p$.

The output $Data_{RX\_EQ}$ of DCD equalizer 10 goes to a rising edge phase-lock loop ("PLL") circuit 30 and a falling edge PLL circuit 40, optionally by way of a transition discriminator 20. Loop circuits 30 and 40 can be identical to the PLL normally used for 100Base-T clock recovery. (In a preferred integrated circuit embodiment, loop circuits 30 and 40 are digital, occupy only 100 mil$^2$, and consume 10 mW.)

The outputs of loop circuits 30 and 40 go to a phase comparator 50. The output of phase comparator 50 goes to a digital filter 60. The output of digital filter 60 goes to a current digital-to-analog converter ("DAC") 80. The output of current DAC 80 is the feedback current $i_p$, which goes to DCD equalizer 10.

Transition discriminator 20 can be included to decrease the lock time for a signal with no eye. Transition discriminator 20 allows loop circuits 30 and 40 to lock to a signal that can be made to contain transitions that, combined with jitter, still provide an eye. Transition discriminator 20 is more fully described in application Ser. No. 08/864,155 (filed May 28, 1997) entitled "Method and Apparatus for Adaptive Equalization using Feedback Indicative of Undercompensation", commonly owned by the assignee of the present application, the disclosure of which is incorporated herein by reference.

The preferred embodiment of adaptive DCD equalization receiver 100, as illustrated in FIG. 4, operates as follows. The DCD equalizer 10 receives the input data $Data_{RX}$ and the feedback current $i_p$, and outputs equalized data $Data_{RX\_EQ}$. Rising edge phase-lock loop circuit 30 locks to a rising edge of the equalized data, and outputs a rising edge recovered clock signal. Falling edge phase-lock loop circuit 40 locks to a falling edge of the equalized data, and outputs a falling edge recovered clock signal. Phase comparator 50 receives the rising edge recovered clock signal and the falling edge recovered clock signal, and outputs a phase comparison signal. Digital filter 60 receives the phase comparison signal and outputs a digital control word. Optionally, filter 60 includes circuitry to detect when PLLs 30 and 40 are in lock, and to output the control word only when both are in lock, which is helpful to reduce loop interaction. Current DAC 80 receives the digital control word and outputs the feedback current $i_p$.

When an input signal has DCD and components of DDJ and RJ, phase-lock loops 30 and 40 will reject the DDJ and RJ components as long as the loop bandwidth is kept narrow. For example, in an ethernet implementation, a narrowband PLL has a loop bandwidth of about 100 parts per million, and a wideband PLL has a loop bandwidth of about 20 percent. The recovered clocks from loops 30 and 40 will lock to whatever edge the loop is looking at. There will be some jitter on the recovered clock signals, but the mean phase will be locked to the mean of the input signal jitter distribution, which will have a mean located at the jitterless rising edge for loop 30, and at the jitterless falling edge for loop 40, where jitterless means no DDJ or RJ, only DCD.

The components of FIG. 4 correspond to FIG. 2 as follows. The DCD equalizer 10 and the optional transition discriminator 20 are components of equalization circuit 110. Loop 30 and loop 40 are components of the signal analysis circuit 120. The recovered clock signals from loops 30 and 40 correspond to analysis result signals 145. Phase comparator 50, filter 60, and DAC 80 are components of control circuit 130. Feedback current $i_p$ corresponds to equalization control signal 135. Signals $Data_{RX}$ and $Data_{RX\_EQ}$ correspond to signals $Data_{in}$ and $Data_{out}$, respectively.

Figure 5:
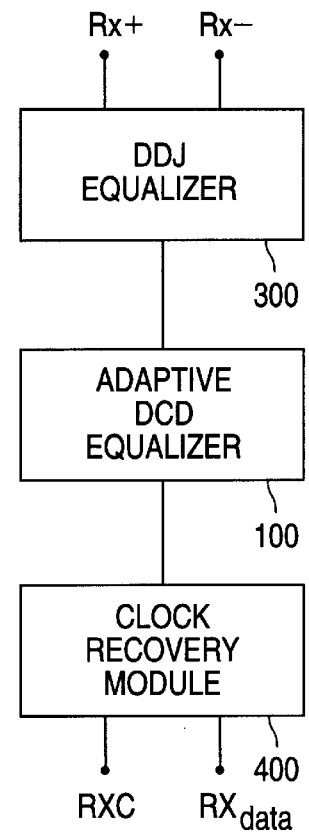
FIG. 5 is a block diagram illustrating a 100Base-T implementation of the receiver embodiment of FIG. 3.

FIG. 5 illustrates a 100Base-T implementation of adaptive DCD equalization receiver 100. The DDJ equalizer 300 receives a negative signal Rx– and a positive signal Rx+. Adaptive DCD equalization receiver 100 receives the output of DDJ equalizer 300. Clock recovery module 400 receives the output of adaptive DCD equalization receiver 100, and outputs a recovered clock signal RXC and recovered data signal $RX_{data}$. Placing adaptive DCD equalization receiver 100 after DDJ equalizer 300 allows adaptive DCD equalization receiver 100 to remove DCD caused both by transmitter rise/fall mismatch, and by errors in the peak detector used for decoding three-level signaling done by MLT3 encoding.

Transmitter Implementation of DCD Equalizer Circuit

Figure 6:
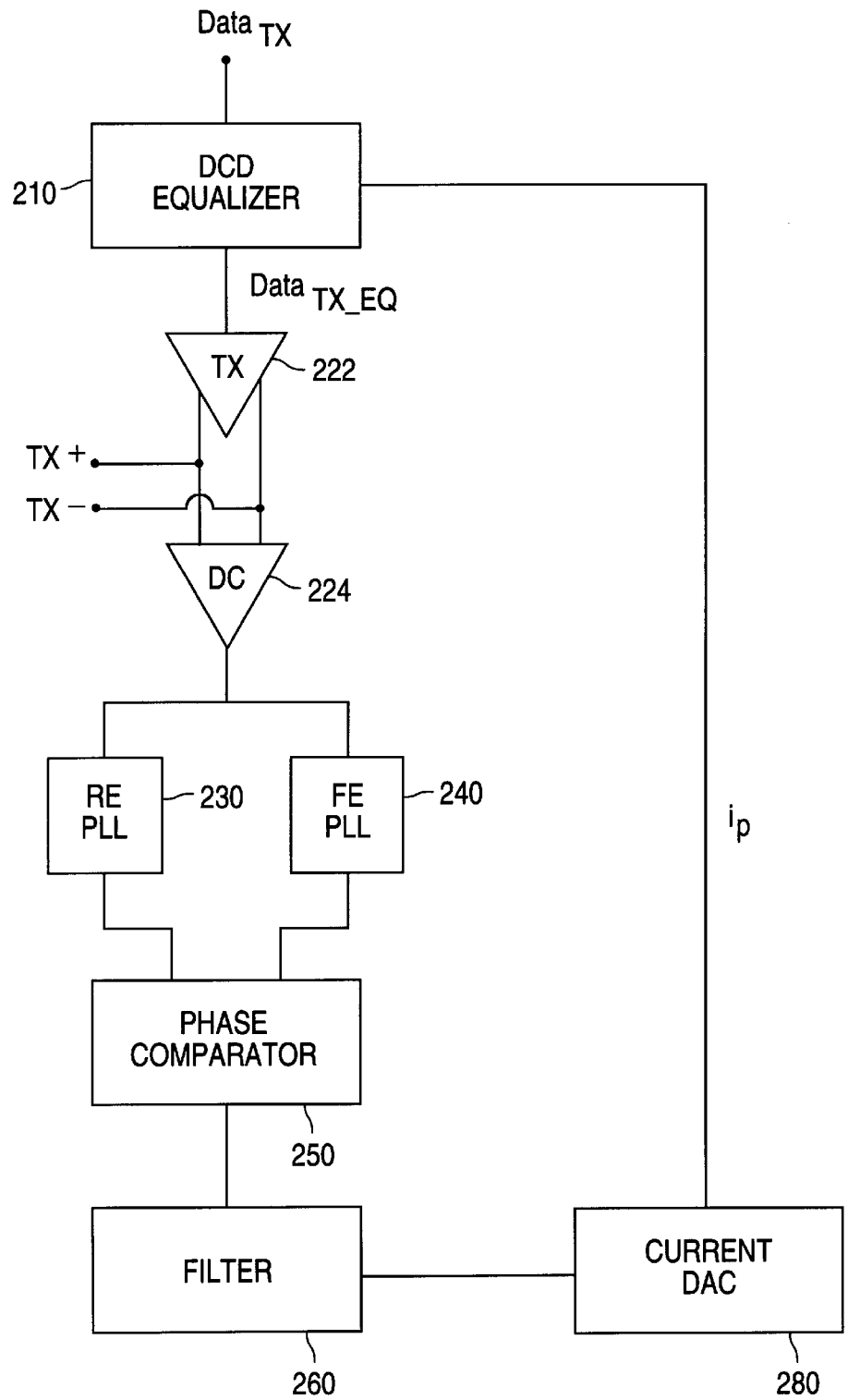
FIG. 6 is a block diagram of a transmitter implementation according to another embodiment of the present invention.

FIG. 6 shows a block diagram of a preferred embodiment of a transmitter implementation of the present invention, termed adaptive DCD equalization transmitter 200. The DCD equalizer 210 receives transmitted data $Data_{TX}$ and a feedback current $i_p$. The output of DCD equalizer 210 goes to a transmitter 222. The outputs of transmitter 222, positive data signal TX+ and negative data signal TX–, go to a differential comparator 224. In actuality, transmitter 222 is used to drive the signal on a cable, and differential comparator 224 is used to sense the signal on the cable.

The output of comparator 224 goes to a rising edge phase-lock loop circuit 230 and a falling edge phase-lock loop circuit 240. The outputs of loop circuits 230 and 240 go to a phase comparator 250. The output of phase comparator 250 goes to a digital filter 260. The output of digital filter 260 goes to a current DAC 280 which outputs the feedback current $i_p$, which goes to DCD equalizer 210.

Alternatively, transmitter 222 can be a differential signal converter, and differential comparator 224 can be a single-ended signal converter.

A preferred embodiment of adaptive DCD equalization transmitter 200, as illustrated in FIG. 6, operates as follows. DCD equalizer 210 receives the transmitted data $Data_{TX}$ and the feedback current $i_p$, and outputs equalized data $Data_{TX\_EQ}$. Transmitter 222 receives the equalized data $Data_{TX\_EQ}$, and outputs positive signal TX+ and negative signal TX–. Differential comparator 224 receives the positive signal TX+ and the negative signal TX–, and outputs a compared output. Rising edge phase-lock loop circuit 230 locks to a rising edge of the compared output, and outputs a rising edge recovered clock signal $RXC_r$. Falling edge phase-lock loop circuit 240 locks to a falling edge of the compared output and outputs a falling edge recovered clock signal $RXC_f$. Phase comparator 250 receives the rising edge recovered clock signal and the falling edge recovered clock signal, and outputs a phase comparison signal. Digital filter 260 receives the phase comparison signal, and outputs a digital control word. Optionally, filter 260 includes circuitry to detect when PLLs 230 and 240 are in lock, and to output the control word only when both are in lock, which is helpful to reduce loop interaction. Current DAC 280 receives the digital control word, and outputs the feedback current $i_p$.

The components of transmitter implementation 200, as shown in FIG. 5, correspond to FIG. 2 as follows. Signals $Data_{TX}$, $Data_{TX\_EQ}$, and $i_p$ correspond to $Data_{in}$, $Data_{out}$, and feedback signal 135, respectively. The DCD equalizer 210 is a component of equalization circuit 110. Transmitter 222, differential comparator 224, PLL 230, and PLL 240 are components of signal analysis circuit 120. Phase comparator 250, filter 260, and current DAC 280 are components of control circuit 130.

Multiport Receiver Implementation

Figure 7:
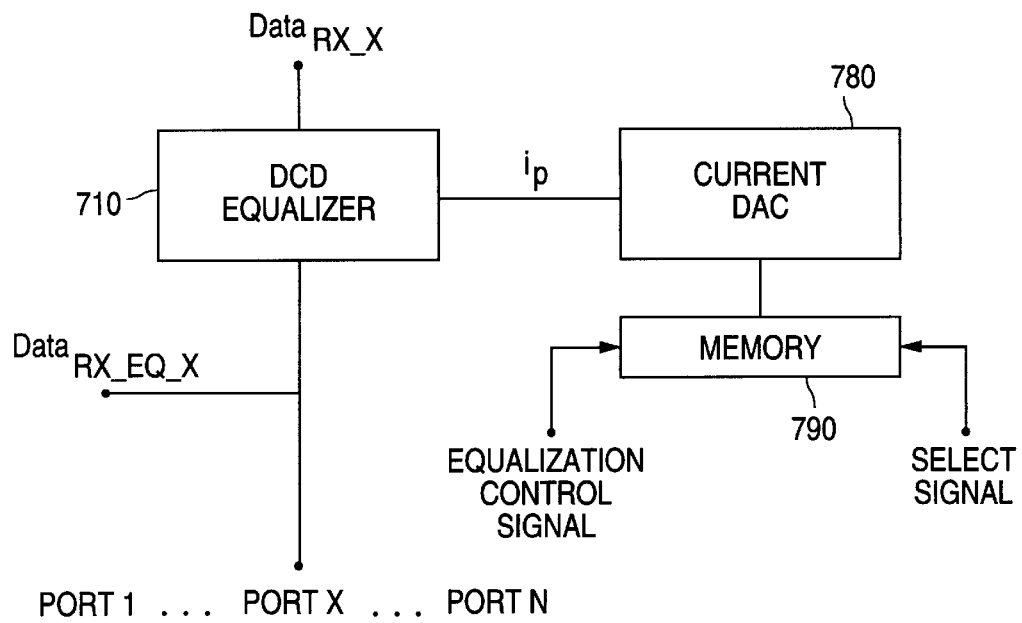
FIG. 7 is a block diagram of a multiport receiver implementation according to another embodiment of the present invention.
Figure 7:
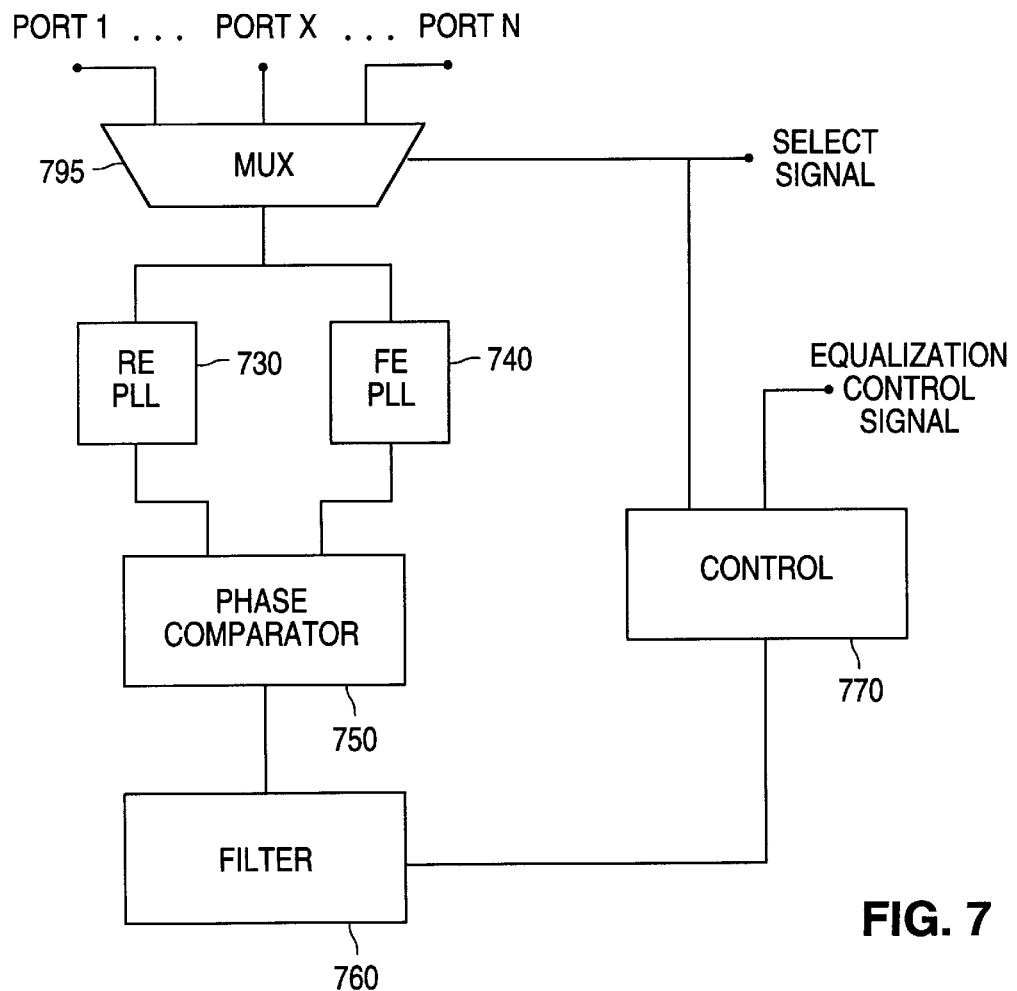

FIG. 7 shows a block diagram of a preferred embodiment of a multiport receiver implementation of the present invention. The multiport receiver includes two functional blocks: a block of components for each of N ports, and another block for the shared components.

Each port has a DCD equalization circuit 710, a digital-to-analog converter 780, and a memory circuit 790. The DCD equalizer 710 and DAC 780 correspond to DCD equalizer 10 and DAC 80 as described above. Memory circuit 790 holds an equalization control signal which DAC 780 converts into the feedback current $i_p$.

The shared components include a multiplexor circuit 795, a rising edge PLL 730, a falling edge PLL 740, a phase comparator 750, a control circuit 770, and a digital filter 760. The PLL 730, PLL 740, phase comparator 750, and filter 760 correspond to PLL 30, PLL 40, phase comparator 50, and filter 60, respectively, as described above. Control circuit 770 connects each port through multiplexor 795 to the shared logic, making that port's equalizer part of the feedback loop. Multiplexor 795 takes as input N signals from the N ports and provides one of the signals to PLL 730 and PLL 740, based on the select signal from control circuit 770. Filter 760 passes the equalization control signal to memory 790.

The embodiment shown in FIG. 7 operates as follows. Each port X receives a signal Data$_{RX\_X}$. The DCD equalizer 710 equalizes the signal based on the equalization control signal into an equalized data signal Data$_{RX\_EQ\_X}$ and passes this signal to multiplexor 795. Control circuit 770 selects port X by providing the select signal to multiplexor 795. The PLLs 730 and 740 lock to the equalized data signal as described above. Phase comparator 750 generates a comparison signal as described above. Filter 760 generates the equalization control signal as described above. Control circuit 770 provides the equalization control signal to memory 790 for port X based on the select signal (e.g., via another multiplexor (not shown)). Then, control circuit 770 proceeds to another one of the ports and repeats the above process. Each memory 790 holds its respective corresponding equalization control signal and provides the signal to DCD equalizer 710.

In a preferred embodiment, control circuit 770 proceeds through each port sequentially.

This allows the feedback loop for the DCD equalizer to be time division multiplexed between N ports, since the DCD at the receiver will either be non-time varying, or will vary with temperature and voltage of the transmitter, which should vary slowly enough that the DCD equalizer feedback loop could be shared. When a port is part of the feedback loop, operation is the same as described above regarding the single port receiver. Using this arrangement, the overhead per port would only be the DCD equalizer, a current DAC, and a memory circuit.

Multiport Transmitter Implementation

Figure 8:
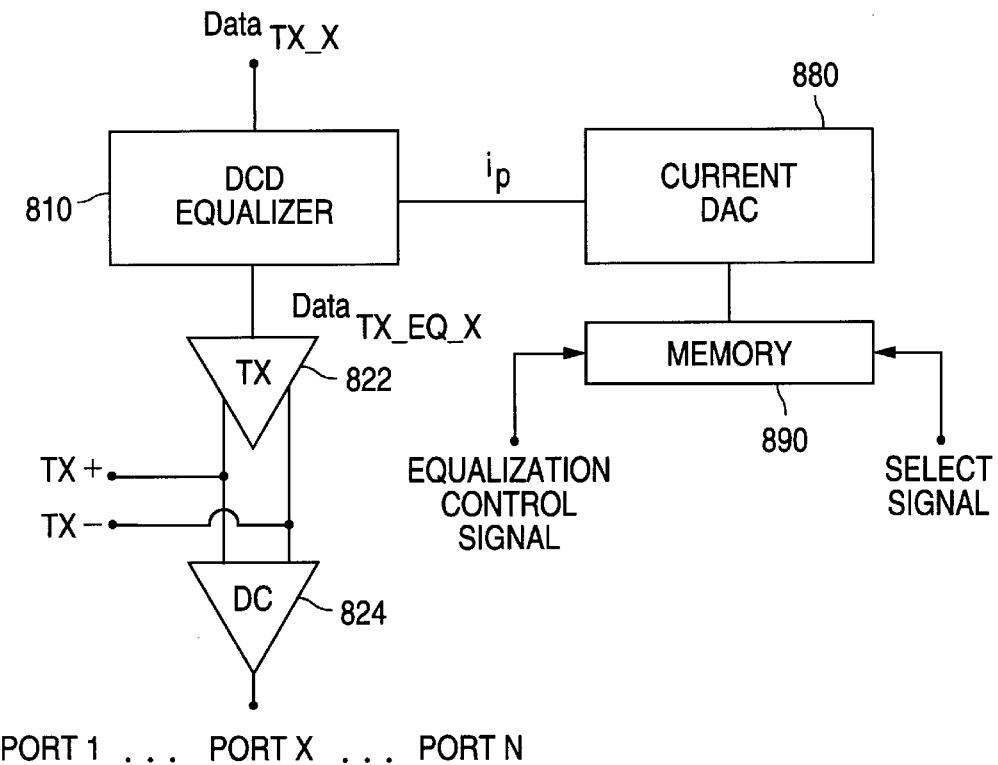
FIG. 8 is a block diagram of a multiport receiver implementation according to another embodiment of the present invention.
Figure 8:
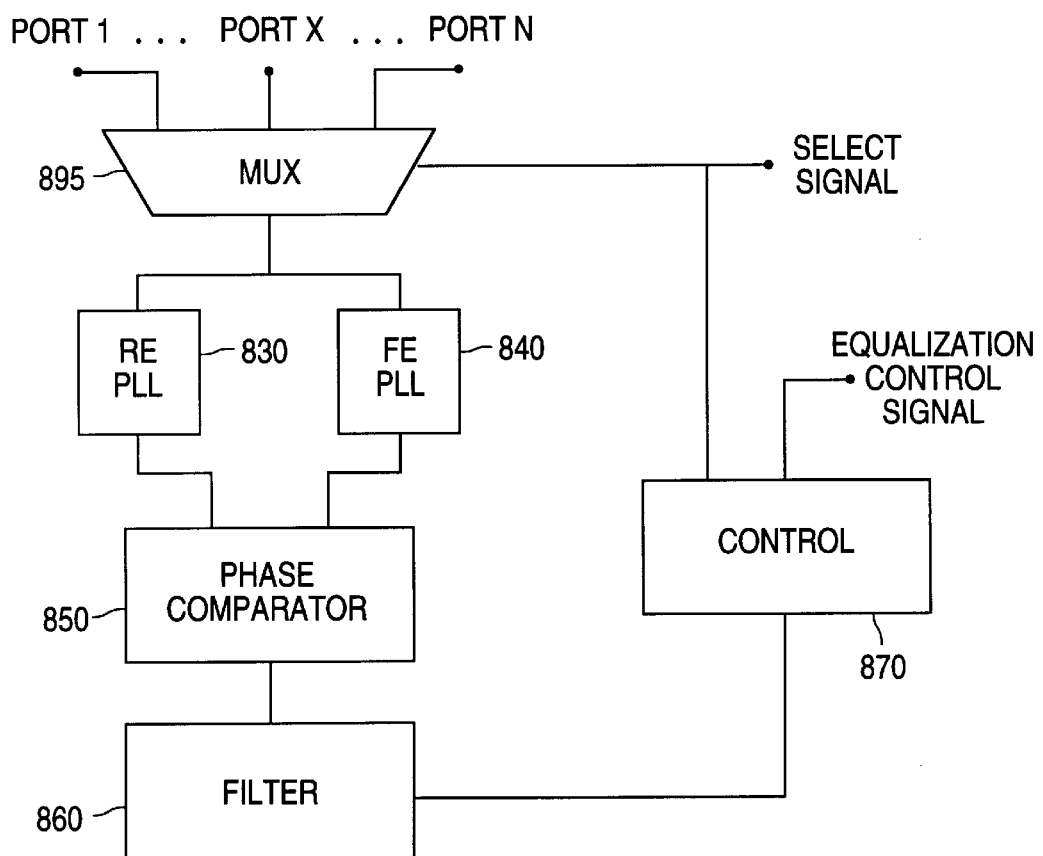

FIG. 8 shows a block diagram of a preferred embodiment of a multiport transmitter implementation of the present invention. The multiport transmitter includes two functional blocks: a block of components for each of N ports, and another block for the shared components.

Each port has a DCD equalization circuit 810, a current digital-to-analog converter (DAC) 880, a memory circuit 890, a transmitter 822, and a differential comparator 824. The DCD equalizer 810 and DAC 880 correspond to DCD equalizer 210 and DAC 280 as described above. Memory circuit 890 holds an equalization control signal which DAC 880 converts into the feedback current $i_p$.

Alternatively, transmitter 822 is a differential signal converter, and differential comparator 824 is a single-ended signal converter.

The shared components include a multiplexor circuit 895, a rising edge PLL 830, a falling edge PLI, 840, a phase comparator 850, a control circuit 870, and a digital filter 860. The PLL 830, PLL 840, phase comparator 850, and filter 860 correspond to PLL 230, PLL 240, phase comparator 250, and filter 260, respectively, as described above. Control circuit 870 connects each port through multiplexor 895 to the shared logic, making that port's equalizer part of the feedback loop. Multiplexor 895 takes as input N signals from the N ports and provides one of the signals to PLL 830 and PLL 840, based on a select signal from control circuit 870. Filter 860 passes the equalization control signal to memory 890.

The embodiment shown in FIG. 8 operates as follows. Each port X receives a signal Data$_{TX\_X}$. The DCD equalizer 810 equalizes the signal based on the equalization control signal into an equalized data signal Data$_{TX\_EQ\_X}$ and passes this signal to transmitter 822. Transmitter 822 generates a positive signal TX+ and a negative signal TX− and provides these to differential comparator 824. Comparator 824 compares these signals and provides the compared signal to multiplexor 895. Control circuit 870 selects port X by providing a select signal to multiplexor 895. The PLLs 830 and 840 lock to the equalized data signal as described above. Phase comparator 850 generates a comparison signal as described above. Filter 860 generates the equalization control signal as described above. Control circuit 870 provides the equalization control signal to memory 890 for port X based on the select signal (e.g., via another multiplexor (not shown)). Then, control circuit 870 proceeds to another one of the ports and repeats the above process. Each memory 890 holds its respective corresponding equalization control signal and provides the signal to DCD equalizer 810.

In a preferred embodiment, control circuit 870 proceeds through each port sequentially.

This allows the feedback loop for the DCD equalizer to be time division multiplexed between N ports, since the DCD at the transmitter will either be non-time varying, or will vary with temperature and voltage of the transmitter, which should vary slowly enough that the DCD equalizer feedback loop could be shared. When a port is part of the feedback loop, operation is the same as described above regarding the single port transmitter. Using this arrangement, the overhead per port would only be the DCD equalizer, a current DAC, and a memory circuit.

Best Mode Implementation

The best mode contemplated for implementation of the invention includes two current mirror circuits and one phase-lock loop circuit.

Figure 9:
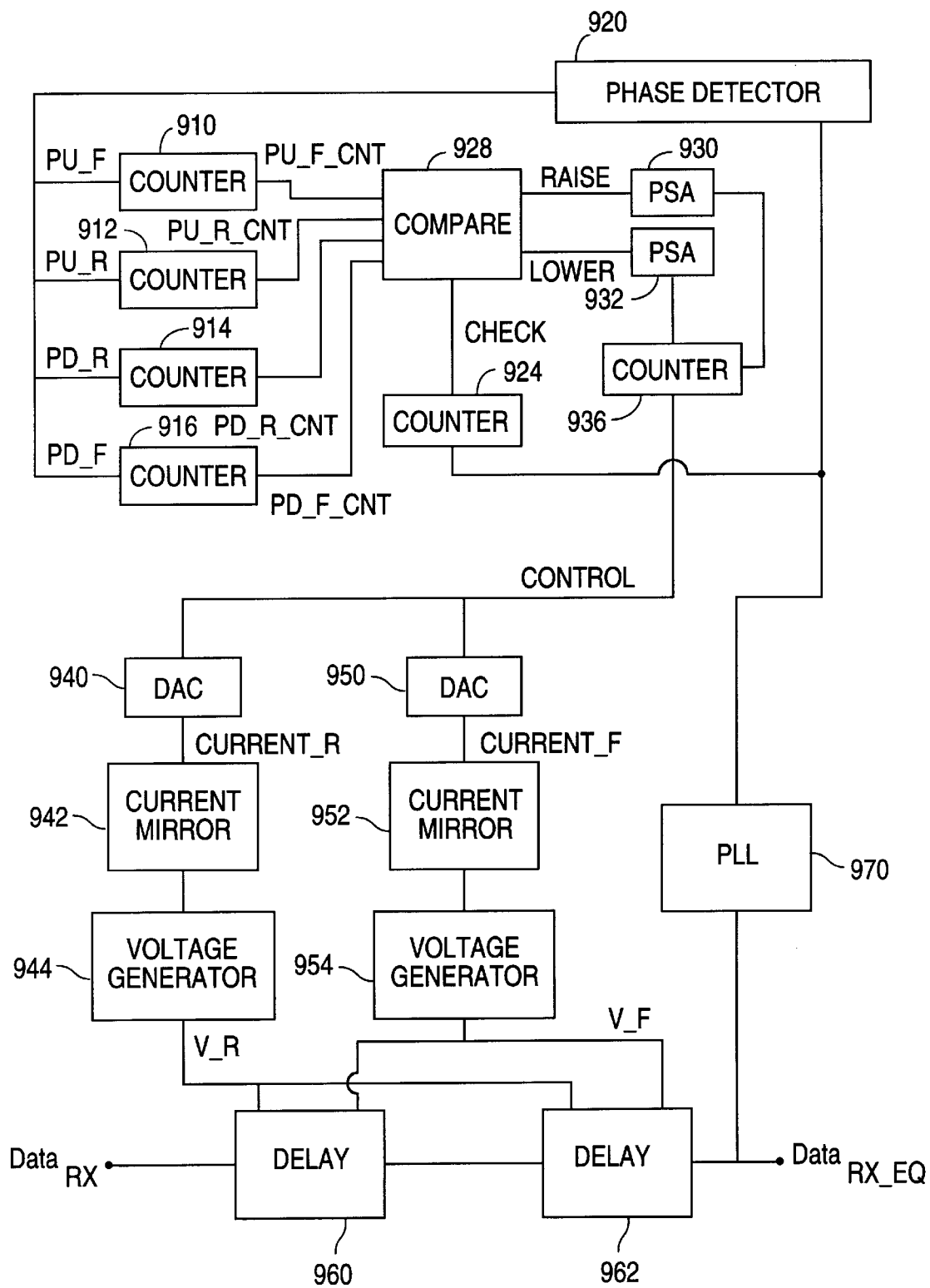
FIG. 9 is a block diagram of a best mode implementation of one aspect of the present invention.

FIG. 9 illustrates a block diagram of the best mode. Counters 910, 912, 914, and 916 count pulses from phase detector 920. Counter 910 counts pulses PU__F which phase detector 920 generates when it detects a lagging error in the falling edge of the recovered clock signal from phase-lock loop 970. Counter 912 counts pulses PU__R, generated from a lagging error in the rising edge. Counter 914 counts pulses PD__R, generated from a leading error in the rising edge. Counter 916 counts pulses PD__F, generated from a leading error in the falling edge.

Counter 924 acts as a timer, sending a CHECK signal to comparison circuit 928 after a set number of clock cycles have passed, as determined from the recovered clock signal from PLL 970. When comparison circuit 928 receives the CHECK signal, comparison circuit 928 compares outputs PU__F__CNT, PU__R__CNT, PD__R__CNT, and PD__F__CNT of the counters 910, 912, 914, and 916, respectively. The CHECK signal also causes counters 910, 912, 914, and 916 to reset.

Comparison circuit 928 generates a RAISE signal if PD__F__CNT>PD__R__CNT or if PU__R__CNT>PU__F__CNT. This will occur when the PLL is locked to a signal with a higher average high time than low time. Comparison circuit 928 generates a LOWER signal if PD__R__CNT>PD__F__CNT or if PU__F__CNT>PU__R__CNT. This will occur when the PLL is locked to a signal with a higher average low time than high time.

The signals RAISE and LOWER are asserted for one clock cycle. The RAISE signal is input to pulse stream attenuator (PSA) 930, and the LOWER signal to PSA 932, which both output to counter 936. Counter 936 counts down by one whenever PSA 930 outputs, and up by one whenever PSA 932 outputs. The output signal CONTROL of counter 936 goes to current digital-to-analog converters (DACs) 940 and 950.

Current DAC 940 outputs a current CURRENT_R inversely proportional to the control signal CONTROL. This current is mirrored through current mirror 942 to voltage generator 944, which creates a control voltage V_R which biases delay stages 960 and 962. As the control signal CONTROL decreases, CURRENT_R increases, V_R decreases, and p-channel current sources in delay stages 960 and 962 supply more current, which decreases the rise time of input signal $Data_{RX}$, producing the output signal $Data_{RX\_EQ}$.

Similarly, current DAC 950 outputs a current CURRENT_R proportional to the control signal CONTROL. This current is mirrored through current mirror 952 to voltage generator 954, which creates a control voltage V_F which biases delay stages 960 and 962. As the control signal CONTROL decreases, CURRENT_R decreases, V_F decreases, and n-channel current sources in delay stages 960 and 962 supply less current, which increases the fall time of input signal $Data_{RX}$, producing the output signal $Data_{RX\_EQ}$.

To complete the feedback loop, the output signal $Data_{RX\_EQ}$ is provided to PLL 970, which recovers the clock signal.

The components illustrated in FIG. 9 correspond to FIG. 2 as follows. Signals $Data_{RX}$ and $Data_{RX\_EQ}$ correspond to $Data_{in}$ and $Data_{out}$, respectively. Signals CURRENT_R and CURRENT_F correspond to feedback signal 135. Current mirrors 942 and 952, voltage generators 944 and 954, and delay circuits 960 and 962 are components of equalization circuit 110. The PLL 970 and phase detector 920 are components of signal analysis circuit 120. Counters 910, 912, 914, 916, 924 and 936, comparison circuit 928, pulse stream attenuators 930 and 932, and current DACs 940 and 950 are components of control circuit 130.

It should be understood that various alternatives to the embodiments of the invention described herein may be employed in practicing the invention. It is intended that the following claims define the scope of the invention and that structures within the scope of these claims and their equivalents are covered thereby.

What is claimed is:

1. An apparatus including a circuit for adaptively equalizing an input data signal by removing duty cycle distortion jitter therefrom, comprising:

an equalization circuit configured to receive an equalization control signal and in accordance therewith receive and equalize an input data signal and in accordance therewith provide an equalized data signal which includes pluralities of rising and falling edges with associated rise and fall times, respectively, wherein said rise and fall times are substantially equal;

a signal analysis circuit, coupled to said equalization circuit, configured to receive and analyze said equalized data signal and in accordance therewith provide a plurality of analysis result signals, wherein each one of said analysis result signals represents one of a plurality of characteristics of said equalized data signal; and a control circuit, coupled to said signal analysis circuit and said equalization circuit, configured to receive and process said plurality of analysis result signals and in accordance therewith provide said equalization control signal.

2. The apparatus of claim 1, wherein:

said equalization circuit comprises a current controlled inverter circuit; and said equalization control signal comprises a current signal.

3. The apparatus of claim 2, wherein said current controlled inverter circuit comprises:

a first current mirror circuit configured to receive an input current and in accordance therewith provide a first mirror current;

a second current mirror circuit configured to receive said current signal and in accordance therewith provide a second mirror current; and an inverter circuit, coupled between said first and second current mirror circuits, configured to receive said first and second mirror currents and said input data signal and in accordance therewith provide said equalized data signal.

4. The apparatus of claim 1, wherein said equalization control signal comprises a first current signal, and a second current signal inversely proportional to said first current signal, and wherein said equalization circuit comprises:

a first current mirror circuit configured to receive said first current signal and in accordance therewith generate a first output;

a second current mirror circuit configured to receive said second current mirror signal and in accordance therewith generate a second output;

a first voltage generator circuit configured to receive said first output and in accordance therewith generate a first voltage;

a second voltage generator circuit configured to receive said second output and in accordance therewith generate a second voltage;

a delay circuit configured to receive said first voltage and said second voltage, and in accordance therewith provide said equalized data signal.

5. The apparatus of claim 1, wherein said signal analysis circuit comprises a signal timing extraction circuit configured to extract timing information from said equalized data signal and in accordance therewith provide a plurality of timing signals as said plurality of analysis result signals, wherein each one of said plurality of timing signals represents one of a plurality of timing characteristics of said equalized data signal.

6. The apparatus of claim 5, wherein said signal timing extraction circuit comprises:

a first phase-lock loop circuit configured to phase-lock to said equalized data signal rising edges and in accordance therewith provide a first recovered clock signal as a first one of said plurality of timing signals; and a second phase-lock loop circuit configured to phase-lock to said equalized data signal falling edges and in accordance therewith provide a second recovered clock signal as a second one of said plurality of timing signals.

7. The apparatus of claim 5, wherein said signal timing extraction circuit comprises:

a phase-lock loop circuit configured to phase-lock to said equalized data signal and in accordance therewith to generate a recovered clock signal;

a first phase detector circuit configured to receive said recovered clock signal and in accordance therewith selectively generate a first signal indicative of a leading error in rising edges of said recovered clock signal and a second signal indicative of a lagging error in said rising edges; and a second phase detector circuit configured to receive said recovered clock signal and in accordance therewith selectively generate a third signal indicative of a leading error in falling edges of said recovered clock signal and a fourth signal indicative of a lagging error in said falling edges.

8. The apparatus of claim 6, wherein:

said first phase-lock loop circuit is further configured to provide a first phase-lock indication signal which indicates when said first recovered clock signal is phase-locked to said equalized data signal rising edges;

said second phase-lock loop circuit is further configured to provide a second phase-lock indication signal which indicates when said second recovered clock signal is phase-locked to said equalized data signal falling edges; and said control circuit is further configured to receive said first and second phase-lock indication signals and in accordance therewith provide said equalization control signal.

9. The apparatus of claim 5, wherein said signal timing extraction circuit comprises:

a differential signal converter configured to receive and convert said equalized data signal to a differential data signal;

a single-ended signal converter, coupled to said differential signal converter, configured to receive and convert said differential data signal to a single-ended data signal which includes pluralities of rising and falling edges corresponding to said equalized data signal rising and falling edges;

a first phase-lock loop circuit configured to phase-lock to said single-ended data signal rising edges and in accordance therewith provide a first recovered clock signal as a first one of said plurality of timing signals; and a second phase-lock loop circuit configured to phase-lock to said single-ended data signal falling edges and in accordance therewith provide a second recovered clock signal as a second one of said plurality of timing signals.

10. The apparatus of claim 9, wherein:

said first phase-lock loop circuit is further configured to provide a first phase-lock indication signal which indicates when said first recovered clock signal is phase-locked to said equalized data signal rising edges;

said second phase-lock loop circuit is further configured to provide a second phase-lock indication signal which indicates when said second recovered clock signal is phase-locked to said equalized data signal falling edges; and said control circuit is further configured to receive said first and second phase-lock indication signals and in accordance therewith provide said is equalization control signal.

11. The apparatus of claim 1, wherein said control circuit comprises:

a signal comparison circuit configured to receive and compare said plurality of analysis result signals and in accordance therewith provide a comparison result signal; and a processing circuit, coupled to said signal comparison circuit, configured to receive and process said comparison result signal and in accordance therewith provide said equalization control signal.

12. The apparatus of claim 11, wherein said signal comparison circuit comprises a phase comparator circuit.

13. The apparatus of claim 11, wherein said processing circuit comprises:

a digital filter circuit configured to filter said comparison result signal and in accordance therewith provide a filtered signal; and a digital-to-analog converter circuit, coupled to said digital filter circuit, configured to receive and convert said filtered signal to an analog signal.

14. The apparatus of claim 11, wherein said signal comparison circuit comprises:

a plurality of counter circuits each configured to receive one of said plurality of analysis result signals and in accordance therewith store a cumulative quantity of the one signal and in accordance therewith output a cumulative quantity signal; and a comparator circuit configured to receive a said cumulative signal from each of said plurality of counter circuits and in accordance therewith provide said comparison result signal.

15. The apparatus of claim 11, wherein said processing circuit comprises:

a counter configured to receive said comparison result signal and in accordance therewith generate a control signal;

a first digital-to-analog converter circuit configured to receive said control signal and in accordance therewith generate a first output signal proportional to said control signal; and a second digital-to-analog converter circuit configured to receive said control signal and in accordance therewith generate a second output signal inversely proportional to said control signal.

16. An apparatus including a circuit for adaptively equalizing an input data signal by removing duty cycle distortion jitter therefrom, comprising:

a plurality of equalization circuits, each configured to receive a select signal and an equalization control signal and in accordance therewith receive and equalize an input data signal and in accordance therewith provide an equalized data signal which includes pluralities of rising an falling edges with associated rise and fall times, respectively, wherein said rise and fall times are substantially equal;

a multiplexor circuit configured to receive a plurality of equalized data signals and in accordance therewith output one of said plurality of equalized data signals based on said select signal;

a signal analysis circuit, coupled to said multiplexor circuit, configured to receive and analyze said one of said plurality and in accordance therewith provide a plurality of analysis result signals, wherein each one of said analysis result signals represents one of a plurality of characteristics of said equalized data signal; and a control circuit, coupled to said signal analysis circuit, said multiplexor circuit, and said plurality of equalization circuits, configured to receive and process said plurality of analysis result signals and in accordance therewith provide said equalization control signal, and configured to output said select signal.

17. The apparatus of claim 16, wherein said signal analysis circuit comprises a signal timing extraction circuit configured to extract timing information from said equalized data signal and in accordance therewith provide a plurality of timing signals as said plurality of analysis result signals, wherein each one of said plurality of timing signals represents one of a plurality of timing characteristics of said equalized data signal.

18. The apparatus of claim 17, wherein said signal timing extraction circuit comprises:
- a first phase-lock loop circuit configured to phase-lock to said equalized data signal rising edges and in accordance therewith provide a first recovered clock signal as a first one of said plurality of timing signals; and
- a second phase-lock loop circuit configured to phase-lock to said equalized data signal falling edges and in accordance therewith provide a second recovered clock signal as a second one of said plurality of timing signals.

19. The apparatus of claim 18, wherein:
- said first phase-lock loop circuit is further configured to provide a first phase-lock indication signal which indicates when said first recovered clock signal is phase-locked to said equalized data signal rising edges;
- said second phase-lock loop circuit is further configured to provide a second phase-lock indication signal which indicates when said second recovered clock signal is phase-locked to said equalized data signal falling edges; and
- said control circuit is further configured to receive said first and second phase-lock indication signals and in accordance therewith provide said equalization control signal.

20. The apparatus of claim 16, wherein each one of said plurality of equalization circuits comprises:
- a current controlled inverter circuit;
- a current digital-to-analog converter circuit, coupled to said current controlled inverter circuit, configured to receive a stored equalization control signal and in accordance therewith output a current equalization control signal to said converter controlled inverter circuit; and
- a memory circuit, coupled to said current digital-to-analog converter circuit, configured to receive said select signal and configured to receive and store said equalization control signal and in accordance therewith output said stored equalization control signal.

21. The apparatus of claim 20, wherein said current controlled inverter circuit comprises:
- a first current mirror circuit configured to receive an input current and in accordance therewith provide a first mirror current;
- a second current mirror circuit configured to receive said current equalization control signal and in accordance therewith provide a second mirror current; and
- an inverter circuit, coupled between said first and second current mirror circuits, configured to receive said first and second mirror currents and said input data signal and in accordance therewith provide said equalized data signal.

22. The apparatus of claim 17, wherein each one of said plurality of equalization circuits further comprises:
- a differential signal converter configured to receive and convert said equalized data signal to a differential data signal; and
- a single-ended signal converter, coupled to said differential signal converter, configured to receive and convert said differential data signal to a single-ended data signal which includes pluralities of rising and falling edges corresponding to said equalized data signal rising and falling edges.

23. The apparatus of claim 22, wherein:
- said first phase-lock loop circuit is further configured to provide a first phase-lock indication signal which indicates when said first recovered clock signal is phase-locked to said equalized data signal rising edges;
- said second phase-lock loop circuit is further configured to provide a second phase-lock indication signal which indicates when said second recovered clock signal is phase-locked to said equalized data signal falling edges; and
- said control circuit is further configured to receive said first and second phase-lock indication signals and in accordance therewith provide said equalization control signal.

24. The apparatus of claim 16, wherein said control circuit comprises:
- a selector circuit, coupled to said multiplexor circuit and said plurality of equalization circuits, configured to generate said select signal;
- a signal comparison circuit configured to receive and compare said analysis result signals and in accordance therewith provide a comparison result signal; and
- a processing circuit, coupled to said signal comparison circuit, configured to receive and process said comparison result signal and in accordance therewith provide said equalization control signal.

25. The apparatus of claim 24, wherein said signal comparison circuit comprises a phase comparator circuit.

26. The apparatus of claim 24, wherein said processing circuit comprises a digital filter circuit.

* * * * *